(12) United States Patent
Tennyson, Jr.

(10) Patent No.: US 7,731,841 B1
(45) Date of Patent: Jun. 8, 2010

(54) FLOW CONTROL SYSTEMS AND METHODS FOR ARTIFICIAL PONDS

(76) Inventor: Irven H. Tennyson, Jr., 20226 English Rd., Mt. Vernon, WA (US) 98274

( * ) Notice: Subject to any disclaimer, the term of this patent is extended or adjusted under 35 U.S.C. 154(b) by 1273 days.

(21) Appl. No.: 11/249,980

(22) Filed: Oct. 13, 2005

(51) Int. Cl.
*C02F 1/74* (2006.01)

(52) U.S. Cl. ............. 210/151; 210/170.02; 210/170.09; 210/196; 210/434; 210/416.1; 210/428; 261/5; 119/255

(58) Field of Classification Search ........................ None
See application file for complete search history.

(56) References Cited

U.S. PATENT DOCUMENTS

| | | | | |
|---|---|---|---|---|
| 1,322,803 A | * | 11/1919 | Macfadden | 237/56 |
| 3,057,094 A | * | 10/1962 | Winkelman | 40/406 |
| 3,192,899 A | * | 7/1965 | Lucey et al. | 119/214 |
| 3,390,665 A | * | 7/1968 | Wininger | 119/254 |
| 3,409,223 A | * | 11/1968 | Gosh | 239/12 |
| 3,662,889 A | | 5/1972 | Takarabe | |
| 3,901,439 A | * | 8/1975 | Willis | 239/12 |
| 3,956,124 A | * | 5/1976 | Fast et al. | 210/600 |
| 4,160,427 A | * | 7/1979 | Holbrook | 119/254 |
| 4,351,270 A | * | 9/1982 | Sabin | 119/246 |
| 4,684,462 A | | 8/1987 | Augustyniak | |
| 4,732,682 A | * | 3/1988 | Rymal | 210/620 |
| 4,747,538 A | * | 5/1988 | Dunn et al. | 239/20 |
| 4,836,142 A | * | 6/1989 | Duback | 119/255 |
| 5,005,521 A | * | 4/1991 | Strong | 119/257 |
| 5,115,974 A | * | 5/1992 | Tobias et al. | 239/23 |
| 5,167,368 A | * | 12/1992 | Nash | 239/17 |
| 5,227,067 A | * | 7/1993 | Runyon | 210/606 |
| 5,306,421 A | | 4/1994 | Weinstein | |
| 5,314,619 A | * | 5/1994 | Runyon | 210/606 |
| 5,476,068 A | * | 12/1995 | Townsend | 119/256 |
| 5,571,409 A | * | 11/1996 | Scarborough | 210/167.25 |
| 5,584,991 A | * | 12/1996 | Wittstock et al. | 210/151 |

(Continued)

FOREIGN PATENT DOCUMENTS

DE 3228205 A 2/1984

(Continued)

OTHER PUBLICATIONS

Website: www.stoneycreekequip.com, 2000, 2 pages.

(Continued)

*Primary Examiner*—Robert James Popovics
(74) *Attorney, Agent, or Firm*—Michael R. Schacht; Schacht Law Office, Inc

(57) ABSTRACT

An aerator system for an artificial pond comprising an aerator housing defining an aerator chamber, filter media arranged within the aerator chamber, and a control valve assembly. The aerator housing defines first, second, and third aerator housing ports. The filter media defines first and second portions of the aerator chamber. The first aerator housing port is in direct fluid communication with the first portion of the aerator chamber, and the second and third aerator housing ports are in to direct fluid communication with the second portion of the aerator chamber. The control valve array is operatively connected to the first and second aerator housing ports and may be configured in a first mode to allow a portion of the water flowing through the aerator housing to bypass the filter media.

18 Claims, 4 Drawing Sheets

U.S. PATENT DOCUMENTS

| | | | | |
|---|---|---|---|---|
| 5,720,056 | A * | 2/1998 | Aymes | 4/488 |
| 5,732,656 | A * | 3/1998 | Tran | 119/254 |
| 5,738,280 | A * | 4/1998 | Ruthenberg | 239/17 |
| 5,849,198 | A | 12/1998 | Sharpless | |
| 5,993,649 | A * | 11/1999 | DeBusk et al. | 210/97 |
| 6,054,045 | A | 4/2000 | Wittstock et al. | |
| 6,073,585 | A * | 6/2000 | Horvath | 119/256 |
| 6,149,070 | A * | 11/2000 | Hones | 239/17 |
| 6,152,381 | A * | 11/2000 | Hones | 239/17 |
| D435,630 | S * | 12/2000 | Sater et al. | D23/201 |
| D437,383 | S * | 2/2001 | Sater et al. | D23/201 |
| D437,628 | S * | 2/2001 | Sater et al. | D23/201 |
| 6,206,298 | B1 * | 3/2001 | Ting | 239/20 |
| 6,209,797 | B1 * | 4/2001 | Jenney | 239/17 |
| 6,238,556 | B1 * | 5/2001 | Hawk et al. | 210/167.13 |
| 6,279,835 | B1 * | 8/2001 | Hansen | 239/20 |
| 6,290,844 | B1 * | 9/2001 | Tennyson, Jr. | 210/170.06 |
| 6,382,520 | B1 * | 5/2002 | Hones | 239/12 |
| 6,405,937 | B1 * | 6/2002 | Stukenberg | 239/12 |
| 6,447,137 | B1 * | 9/2002 | Long | 362/96 |
| 6,461,501 | B1 * | 10/2002 | Porter | 210/167.31 |
| 6,527,257 | B1 * | 3/2003 | Schuld | 261/29 |
| 6,634,138 | B2 * | 10/2003 | Katzman | 47/79 |
| 6,651,586 | B2 * | 11/2003 | Horth et al. | 119/246 |
| 6,709,580 | B2 * | 3/2004 | Ouwinga | 210/167.01 |
| 6,740,232 | B1 * | 5/2004 | Beaulieu | 210/151 |
| 6,779,739 | B2 * | 8/2004 | Mulvaney | 239/17 |
| 6,821,416 | B1 * | 11/2004 | Kelly et al. | 210/167.01 |
| 6,843,910 | B1 * | 1/2005 | Thomas | 210/167.01 |
| 6,863,807 | B2 * | 3/2005 | Crawford, III | 210/170.09 |
| 7,114,668 | B2 * | 10/2006 | Beaulieu | 210/170.09 |
| 7,144,501 | B2 * | 12/2006 | Beaulieu et al. | 210/167.01 |
| 7,153,418 | B2 * | 12/2006 | Mauro et al. | 210/167.01 |
| 7,160,445 | B2 * | 1/2007 | Sonnenberg | 210/167.31 |
| 7,351,007 | B2 * | 4/2008 | Ouwinga | 405/52 |
| 7,425,268 | B2 * | 9/2008 | Russell | 210/617 |
| 2001/0022286 | A1 * | 9/2001 | Hawk et al. | 210/108 |
| 2002/0175117 | A1 * | 11/2002 | Ouwinga | 210/242.1 |
| 2003/0047509 | A1 * | 3/2003 | Whitehill | 210/616 |
| 2004/0057839 | A1 * | 3/2004 | Crawford, III | 417/87 |
| 2004/0111978 | A1 * | 6/2004 | Cunningham et al. | 52/4 |
| 2004/0173523 | A1 * | 9/2004 | Beaulieu | 210/602 |
| 2004/0182765 | A1 * | 9/2004 | Mauro et al. | 210/169 |
| 2004/0226870 | A1 * | 11/2004 | Sonnenberg | 210/167 |
| 2005/0161380 | A1 * | 7/2005 | Crawford | 210/170 |
| 2005/0167347 | A1 * | 8/2005 | Thomas | 210/170 |
| 2005/0263446 | A1 * | 12/2005 | Beaulieu et al. | 210/169 |
| 2006/0191828 | A1 * | 8/2006 | Cummins | 210/97 |
| 2007/0107664 | A1 * | 5/2007 | Wittstock et al. | 119/246 |
| 2007/0138314 | A1 * | 6/2007 | Weemhoff | 239/16 |
| 2008/0217226 | A1 * | 9/2008 | Porter | 210/170.02 |
| 2008/0251448 | A1 * | 10/2008 | Kent | 210/602 |

FOREIGN PATENT DOCUMENTS

| | | |
|---|---|---|
| JP | 57-201508 A | 12/1982 |
| WO | 9940781 A1 | 8/1999 |

OTHER PUBLICATIONS

Website: www.aquascapes.com, Apr. 2000, 7 pages.

* cited by examiner

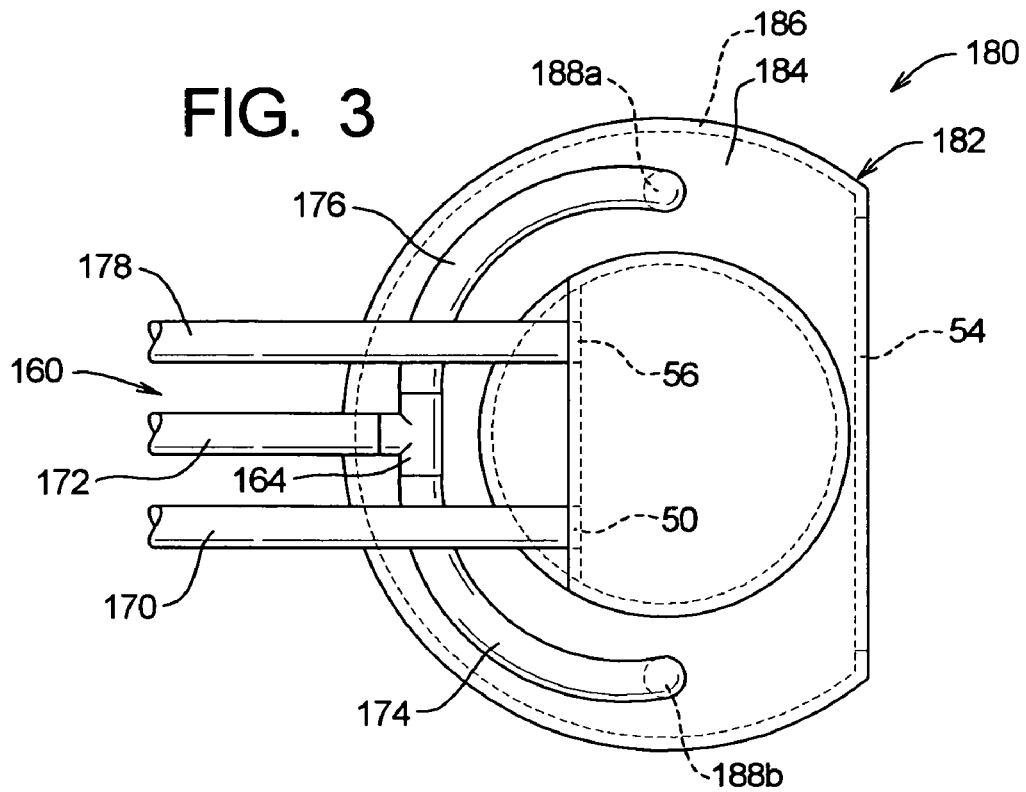
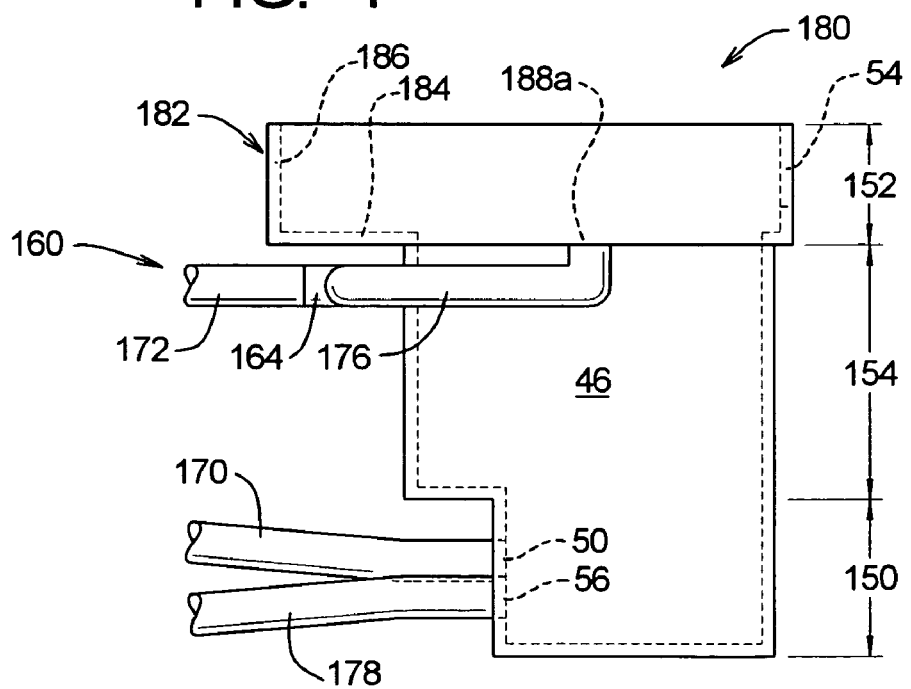

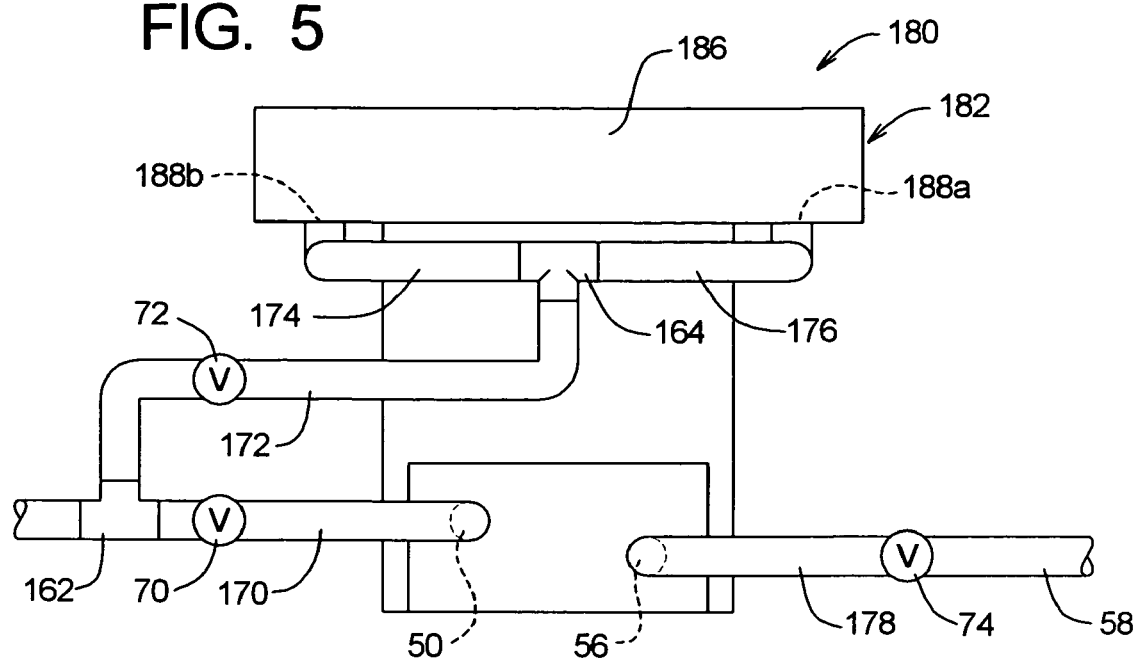

FLOW CONTROL SYSTEMS AND METHODS FOR ARTIFICIAL PONDS

TECHNICAL FIELD

The present invention relates to flow control systems and methods for artificial ponds and, more specifically, to flow control systems and methods that improve the flow of pond water through an artificial pond water system.

BACKGROUND OF THE INVENTION

Residential and commercial gardens often include ponds as part of the landscaping. These ponds are designed and constructed to look as natural as possible, but are often placed at locations where natural conditions for supporting a healthy pond are not found. Accordingly, pumps, filters, aerators, and the like are employed to support the healthy functioning of the pond. This type of pond will be referred to herein as an "artificial pond system".

Commonly, artificial pond systems include a pump housing or vault that is arranged adjacent to the pond such that water flows by gravity from the pond into the pump vault. A pump is located in the pump vault to pump water within the pump vault into an aerator, such as waterfall or fountain, that reintroduces the water back into the pond. Under most conditions, the constant circulation of the water by the pump through the aerator promotes a healthy environment in the artificial pond system.

Often, filters are arranged within the aerator portion of an artificial pond system. The filters in the aerator portion of an artificial pond system typically comprise filter media that supports the growth of biological organisms such as bacteria that remove waste from the water flowing through aerator system. The combination of the filter media and the biological organism are referred to as a biological filter.

Conventionally, the biological filter determines the maximum flow rate of water through the artificial pond water system. In particular, if water flows through the filter media at a flow rate that exceeds the maximum flow rate, the water can carry the biological organisms forming part of the biological filter out of the filter media.

In addition, in conventional aerator systems, the filter media must be periodically cleaned. The process of cleaning the filter media portion of a biological filter can be messy and inconvenient.

The need thus exists for improved systems and methods for controlling the flow of water through the aerator portion of an artificial pond water system.

SUMMARY OF THE INVENTION

The present invention may be embodied as an aerator system for an artificial pond comprising an aerator housing defining an aerator chamber, filter media arranged within the aerator chamber, and a control valve assembly. The aerator housing defines first, second, and third aerator housing ports. The filter media defines first and second portions of the aerator chamber. The first aerator housing port is in direct fluid communication with the first portion of the aerator chamber, and the second and third aerator housing ports are in direct fluid communication with the second portion of the aerator chamber. The control valve array is operatively connected to the first and second aerator housing ports and may be configured in a first mode to allow a portion of the water flowing through the aerator housing to bypass the filter media.

BRIEF DESCRIPTION OF THE DRAWINGS

FIG. 3 is a bottom plan view of a portion of the example aerator system depicted in FIG. 2;

FIG. 4 is a side elevation view of a portion of the example aerator system depicted in FIG. 2;

FIG. 5 is a somewhat schematic rear elevation view of the aerator system depicted in FIG. 2;

DETAILED DESCRIPTION OF THE INVENTION

Figure 1:
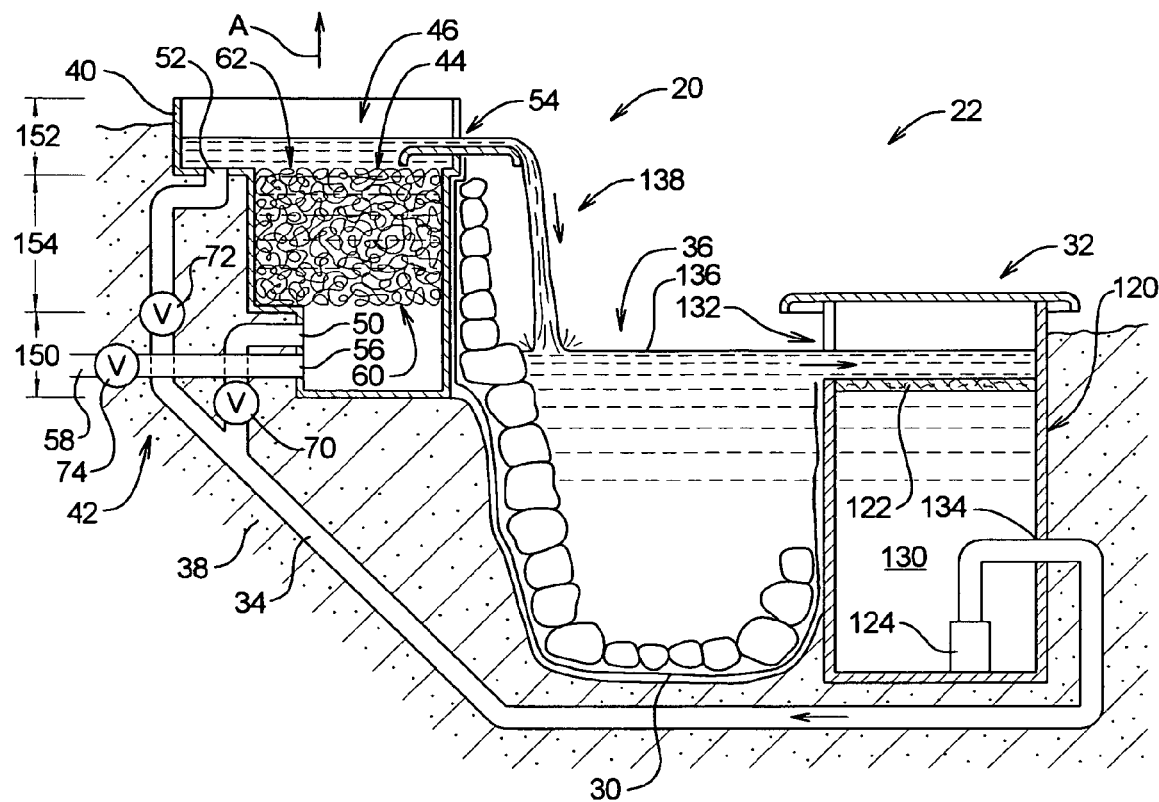
FIG. 1 is a side elevation section view depicting an example pond system incorporating the principles of the present invention.

Referring initially to FIG. 1 of the drawing, depicted at 20 therein is an aerator system constructed in accordance with, and embodying, the principles of the present invention. The example aerator system 20 is shown in the context of an example artificial pond system 22.

The example artificial pond system 22 comprises, in addition to the aerator system 20, a pond liner 30, a pump system 32, and a connecting pipe assembly 34. The pond liner 30 at least partly defines a pond 36 and helps reduce water loss to the surrounding earth 38. In use, the pump system 32 continuously forces water through the pond 36, the connecting pipe assembly 34, and the aerator system 20. During normal operation of the artificial pond system 22, water from aerator system 20 is returned to the pond 36.

The example aerator system 20 comprises an aerator housing 40, a valve array 42, and a biological filter 44. The aerator housing 40 defines an aerator chamber 46, and the valve array 42 is configured to control the flow of water from the pump system 32 into the aerator chamber 46. In particular, the valve array 42 allows the user to control the amount of water that passes in a primary direction A through the biological filter 44 when flowing through the aerator housing 40.

The example aerator housing 40 defines first, second, third, and fourth aerator housing ports 50, 52, 54, and 56. Water flows into the aerator chamber 46 through the first aerator housing port 50 and/or the second aerator housing port 52. Water flows out of the aerator chamber 46 through the third aerator housing port 54 and/or the fourth aerator housing port 56. Water flowing out of the aerator chamber 46 through the third aerator housing port 54 flows into the pond 36. Water flowing out of the aerator chamber 46 through the fourth aerator housing port 56 flows into a waste pipe 58.

The first aerator housing port 50 is arranged on a first side 60 of the biological filter 44 such that water flowing into the aerator housing 40 through the first aerator housing port 50 must flow through the biological filter 44 to reach the third aerator housing port 54. The second aerator housing port 52 is arranged on a second side 62 of the biological filter 44 such that water flowing into the aerator housing 40 through the second aerator housing port 52 may reach the third aerator housing port 54 without flow through the biological filter 44.

The example valve array 42 comprises first, second, and third valve to assemblies 70, 72, and 74. The first valve assembly 70 is connected between the connecting pipe assembly 34 and the first aerator housing port 50. The second valve assembly 72 is connected between the connecting pipe assembly 34 and the second aerator housing port 52. The third valve assembly 74 is connected between the fourth aerator is housing port 56 and the waste pipe 58.

The example valve array 42 may be placed in any one of a number of modes. In a first mode, the first and second valve assemblies 70 and 72 are at least partly open to allow water to flow on both the first and second sides 60 and 62 of the biological filter 44. When in the first mode, the valve array 42 allows the user to set the total flow of water through the aerator system 20 at a desired level.

At the same time, when the valve array 42 is in the first mode, the first valve assembly 70 can be set to allow only enough water to flow through the biological filter 44 to adequately filter the water in the pond system 22 without disrupting operation of the biological filter 44. The filtered water flowing through the first valve assembly 70 and the biological filter 44 and the unfiltered bypass water flowing through the second valve assembly 72 are eventually mixed in the pond 36. Accordingly, all of the water flowing through the pond system 22 eventually passes through and is filtered by the biological filter 44.

In a second mode, the first valve assembly 70 is closed and the second and third valve assemblies 72 and 74 are opened. In this second mode, water flowing through the aerator chamber 46 flows in a reverse direction opposite the primary direction A from the second side 62 to the first side 60 of the biological filter 44 and out of the aerator housing 40 through the waste pipe 58. This reverse flow of water through the biological filter 44 effectively back-flushes the biological filter 44. Periodic back-flushing of the filter 44 can remove sediment that would otherwise clog the biological filter 44.

The valve array 42 can further operate in a third mode in which the second and third valve assemblies 72 and 74 are closed and the first valve assembly 70 is at least partly open. In this third mode, the pond system 22 operates in a conventional manner, with all of the water that flows through the aerator system 20 flowing through the biological filter 44.

The aerator system 20 may be implemented in other forms. In particular, the fourth aerator housing port 56, the third valve assembly 74, and the waste pipe 58 may be omitted from the valve array 42. In this case, the valve array 42 will not operate in the second mode to allow back-flushing of the biological filter 44.

In another optional form, the second aerator housing port 52 and the second valve assembly 72 may be omitted. In this form of the aerator system 20, the valve array 42 may not be used in the first mode to bypass the biological filter 44, but the filter 44 can be back-flushed by using a hose to direct water into the third aerator housing port 54 and opening the third valve assembly 74 to allow water to flow through the waste pipe 58.

With the foregoing general understanding of the aerator system 20 and the artificial pond system 22 in mind, the details of construction and operation of the artificial pond system 22 and an example of an aerator system that may be used as the aerator system 20 generally described above.

Referring still to FIG. 1, it can be seen that the pump system 32 comprises a pump housing assembly 120, a sediment filter 122, and a pump 124. The pump housing assembly 120 defines a pump chamber 130, a pump chamber inlet port 132, and a pump chamber outlet port 134. At least a portion of the pump chamber inlet port 132 is arranged below a normal water level 136 of the water in the pond 36. The pump 124 is arranged within the pump chamber 130 and is operatively connected to the connecting pipe assembly 34. The connecting pipe assembly 34 extends through the pump chamber outlet port 134. A seal is formed between the connecting pipe assembly 34 and the pump chamber outlet port 134 such that water flows out of the pump chamber outlet port 134 through the connecting pipe assembly 34.

During normal operation of the artificial pond system 22, gravity causes water to flow from the pond 36, through the pump chamber inlet is port 132, through the sediment filter 122, and into the pump chamber 130.

The sediment filter 122 is thus designed and arranged to prevent debris in the pond 36 from reaching the pump 124. The pump 124 pumps water out of the pump chamber 130 through the connecting pipe assembly 34.

As is apparent from FIG. 1, the aerator housing 40 is arranged such that the third aerator housing port 54 is at least partly above the normal water level 136 of the pond 36. Typically, the third aerator housing port 54 is elevated with respect to the normal water level 136 such that water within the aerator chamber 46 falls a short distance before reaching the pond 36. In particular, in the example artificial pond system 22, a waterfall 138 is formed by water falling from the third aerator housing port 54 to the pond 36. The waterfall 138 functions to aerate the water flowing through the artificial pond system 22. The waterfall 138 is further desirable for aesthetic reasons.

Figure 2:
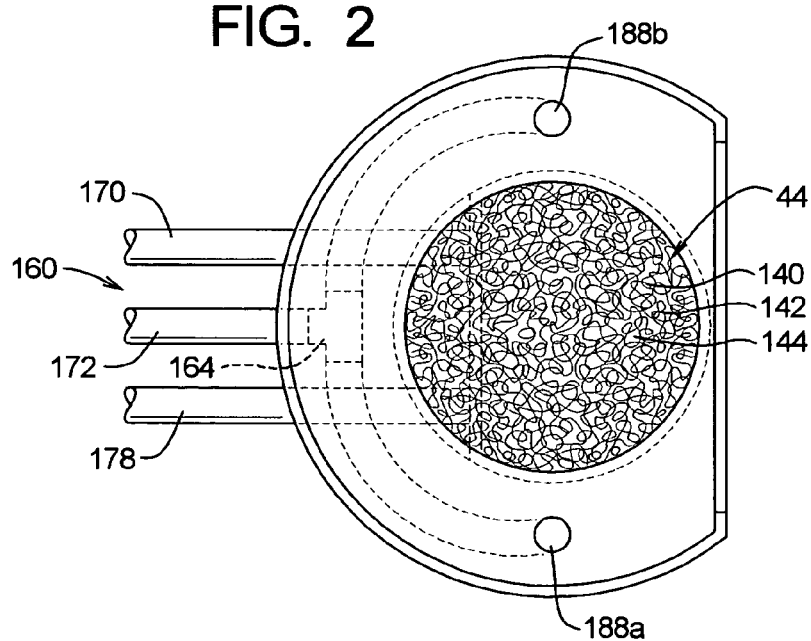
FIG. 2 is a top plan view of a portion of an example aerator system that may be used in the system of FIG. 1.

As shown in FIGS. 1 and 2, the biological filter 44 comprises filter media 140 that is placed in the aerator chamber 46. The filter media 140 may take many forms, but in the example aerator system 20 takes the form of randomly oriented plastic fibers 142 that define interstitial spaces 144. The fibers 142 are lightly bonded to each other such that they remain in place during normal use of the filter 44. As is well-known in the art, the biological filter 44 further comprises biological organisms (not shown) that are trapped in the interstitial spaces by the fibers 142 such that water flowing through the filter media 140 is exposed to these organisms. The trapped biological organisms consume certain forms of waste in the water flowing through the filter spaces 144. For proper operation of the biological filter 44, water should be able to flow through the filter media 140 relatively freely. The construction and operation of the biological filter is or may be conventional and will not be described herein in further detail.

FIGS. 1 and 4 illustrate that the filter media 140 divides the aerator is chamber 46 into first, second, and third chamber portions 150, 152, and 154. The filter media 140 occupies the third chamber portion 154. The first chamber portion 150 is on the first side 60 of the filter 44, while the second chamber portion 152 is on the second side 62 of the filter 44.

Figure 7:
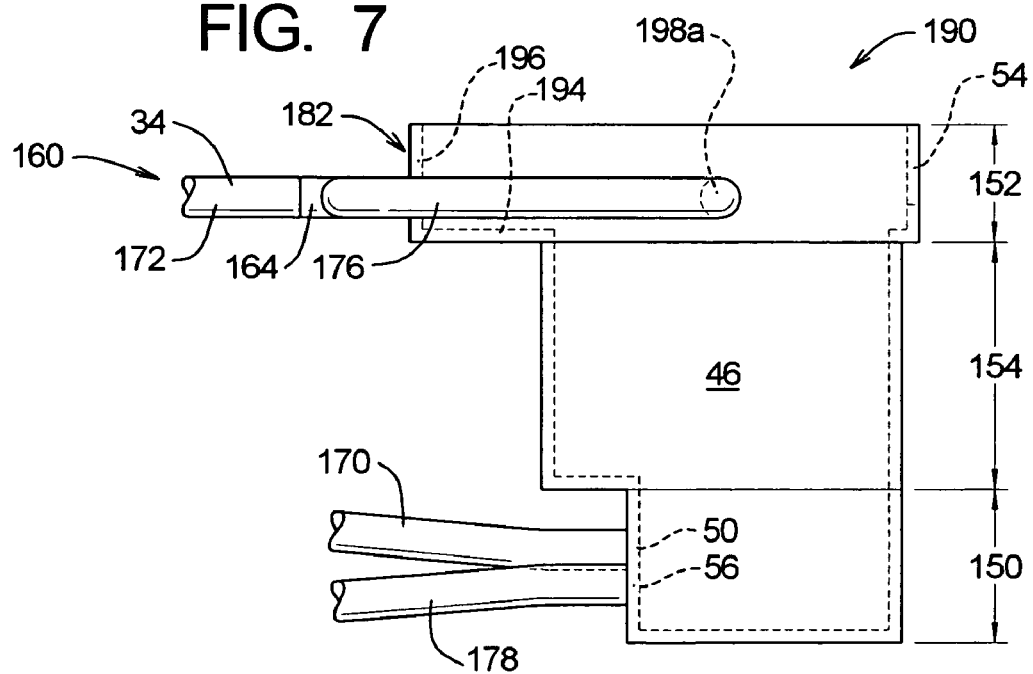
FIG. 7 is a side elevation view of a portion of the example aerator system depicted in FIG. 6.

FIGS. 2-4 and 7 illustrate the details of a valve array 160 that may be used in example aerator system 20. The example valve array 160 comprises first and second T-fittings 162 and 164. As shown in FIG. 7, the first T-fitting 162 is connected to the connecting pipe assembly 34.

The example valve array 160 further comprises first, second, third, fourth, and fifth pipe sections 170, 172, 174, 176, and 178. The first pipe section 170 is connected between the first T-fitting 162 and the first aerator housing port 50. The first valve assembly 70 is arranged in the first pipe section 170. The second pipe section 172 extends between the first and second T-fittings 162 and 164, and the second valve assembly 72 is arranged in the second pipe section 172. The fifth pipe section 178 extends between the fourth aerator housing port 56 and the third valve assembly 74.

FIGS. 2-4 and 7 further illustrate the details of an aerator housing 180 that may be used in example aerator system 20. The example aerator housing 180 comprises an enlarged portion 182 defined by a first wall 184 and a second wall 186. The enlarged portion 182 defines the boundaries of the second portion 152 of the aerator chamber 46. In the example aerator housing 180, the second aerator housing port 52 takes the form first and second openings 188a and 188b formed in the first wall 184, and the third aerator housing port 54 takes the form of a lowered section of the second wall 186. The third and fourth pipe sections 174 and 176 extend between the second T-fitting 164 and the first and second openings 188a and 188b, respectively.

Figure 6:
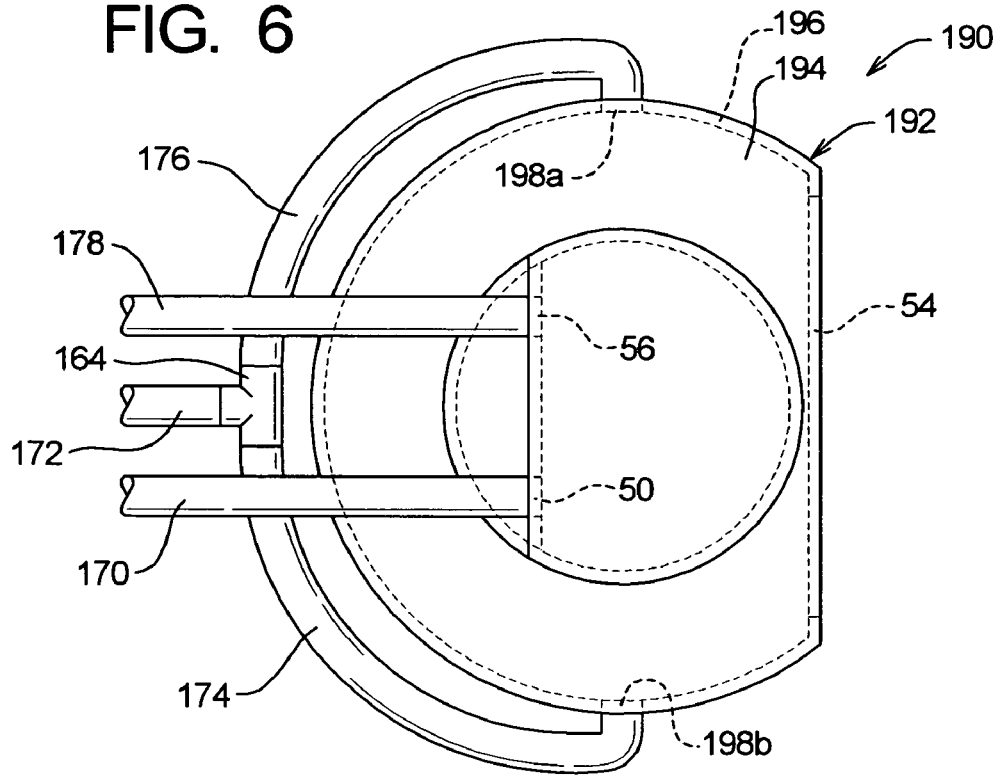
FIG. 6 is a bottom plan view of an portion of another example aerator system that may be used in the system of FIG. 1.

Referring now to FIGS. 6 and 7 of the application, depicted therein is an aerator housing 190 that may be used in place of the aerator housing 180 described above. The example aerator housing 190 comprised an enlarged portion 192 defined by a first wall 194 and a second wall 196. The enlarged portion 192 defines the boundaries of the second portion 152 of the aerator chamber 46. In the example aerator housing 190, the second aerator housing port 52 takes the form of first and second openings 198a and 198b formed in the second wall 196. The third aerator housing port 54 takes the form of a lowered section of the second wall 196. The third and fourth pipe sections 174 and 176 extend between the second T-fitting 164 and the first and second openings 198a and 198b, respectively.

From the foregoing, it should be apparent that the present invention may be embodied in forms other than the example preferred embodiment described above. The scope of the present invention should be determined by the claims appended hereto and not the foregoing detailed description.

I claim:

1. An aerator system for an artificial pond comprising:
   an aerator housing defining an aerator chamber and first, second, and third aerator housing ports;
   filter media arranged within the aerator housing, where the filter media defines first and second portions of the aerator chamber, where
      the first aerator housing port is in direct fluid communication with the first portion of the aerator chamber, and
      the second and third aerator housing ports are in direct fluid communication with the second portion of the aerator chamber;
   a control valve array operatively connected to the first and second aerator housing ports; whereby
   in a first mode, the control valve array allows a portion of the water flowing through the aerator housing to bypass the filter media.

2. An aerator system as recited in claim 1, in which the control valve array allows a portion of the water to flow into the aerator housing through the first aerator housing port and a portion of the water to flow into the aerator housing through the second aerator housing port when the control valve assembly is in the first mode.

3. An aerator system as recited in claim 1, in which water flowing through the aerator housing flows out of the third aerator housing port.

4. An aerator system as recited in claim 1, in which:
   the aerator housing further defines a fourth aerator housing port, where the fourth aerator housing port is in direct fluid communication with the first portion of the aerator chamber; and
   in a second mode, the control valve array allows water to flow into the aerator chamber through the second aerator housing port and out of the aerator chamber through the fourth aerator housing port.

5. An aerator system as recited in claim 4, in which the control valve array comprises first, second, and third valve assemblies, where the first, second, and third valve assemblies are operatively connected to the first, second, and fourth aerator housing ports, respectively.

6. An aerator system as recited in claim 5, in which the first valve assembly is closed and the second and third valve assemblies are at least partly open when the control valve array is in the second mode.

7. An aerator system as recited in claim 1, in which the control valve array comprises first and second valve assemblies, where the first and second valve assemblies are operatively connected to the first and second aerator housing ports, respectively.

8. An aerator system as recited in claim 7, in which the first and second valve assemblies are at least partly open when the control valve array is in the first mode.

9. An aerator system as recited in claim 1, in which the control valve array in be configured in a third mode to allow all of the water flowing through the aerator housing to flow through the filter media.

10. An aerator system for an artificial pond comprising:
    an aerator housing defining an aerator chamber and first, second, third, and fourth aerator housing ports;
    filter media arranged within the aerator housing, where the filter media defines first and second portions of the aerator chamber,
       the first and fourth aerator housing ports are in direct fluid communication with the first portion of the aerator chamber, and
       the second and third aerator housing ports are in direct fluid communication with the second portion of the aerator chamber;
    a control valve array operatively connected to the first and second aerator housing ports; whereby
    in a first mode, the control valve array allows a portion of the water flowing through the aerator housing to bypass the filter media; and
    in a second mode, the control valve array allows water to flow into the aerator chamber through the second aerator housing port and out of the aerator chamber through the fourth aerator housing port.

11. An aerator system as recited in claim 10, in which the control valve array allows a portion of the water to flow into the aerator housing through the first aerator housing port and a portion of the water to flow into the aerator housing through the second aerator housing port when the control valve assembly is in the first mode.

12. An aerator system as recited in claim 11, in which the water flowing through the aerator housing flows out of the third aerator housing port when the control valve array is in the first mode.

13. An aerator system as recited in claim 11, in which the control valve array comprises first, second, and third valve assemblies, where the first, second, and third valve assemblies are operatively connected to the first, second, and fourth aerator housing ports, respectively.

14. An aerator system as recited in claim 13, in which
    the first and second valve assemblies are at least partly open when the control valve array is in the first mode; and
    the first valve assembly is closed and the second and third valve assemblies are at least partly open when the control valve array is in the second mode.

15. An artificial pond water system comprising:
    a pond;
    a pump vault assembly arranged such that water in the pond flows into the pump vault;
    a pump arranged within the pump vault;
    an aerator housing defining an aerator chamber and first, second, and third aerator housing ports, where the third aerator housing port is arranged such that water flowing out of the aerator chamber through the third aerator housing port flows into the pond;

filter media arranged within the aerator housing, where the filter media defines first and second portions of the aerator chamber, where the first aerator housing port is in direct fluid communication with the first portion of the aerator chamber, and the second and third aerator housing ports are in direct fluid communication with the second portion of the aerator chamber;

a control valve array operatively connected between the pump and the first and second aerator housing ports; whereby in a first mode, the control valve array allows a portion of the water flowing through the aerator housing to bypass the filter media.

16. An artificial pond water system as recited in claim 15, in which:

the aerator housing further defines a fourth aerator housing port, where the fourth aerator housing port is in direct fluid communication with the first portion of the aerator chamber; and in a second mode, the control valve array allows water to flow into the aerator chamber through the second aerator housing port and out of the aerator chamber through the fourth aerator housing port.

17. An artificial pond system as recited in claim 16, in which:

the control valve array comprises first, second, and third valve assemblies, where the first, second, and third valve assemblies are operatively connected to the first, second, and fourth aerator housing ports, respectively; and the first valve assembly is closed and the second and third valve assemblies are at least partly open when the control valve array is in the second mode.

18. An artificial pond system as recited in claim 15, in which:

the control valve array comprises first and second valve assemblies, where the first and second valve assemblies are operatively connected to the first and second aerator housing ports, respectively; and the first and second valve assemblies are at least partly open when the control valve array is in the first mode.

\* \* \* \* \*